United States Patent
Weng et al.

(10) Patent No.: US 10,243,431 B2
(45) Date of Patent: Mar. 26, 2019

(54) HEAT DISSIPATION APPARATUS FOR MOTORS

(71) Applicant: Industrial Technology Research Institute, Hsin-Chu (TW)

(72) Inventors: Ying-Che Weng, Taoyuan County (TW); Chun-Han Chen, Hsinchu (TW); Hung-Cheng Yen, Kaohsiung (TW); Yung-Jen Cheng, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 433 days.

(21) Appl. No.: 14/674,325

(22) Filed: Mar. 31, 2015

(65) Prior Publication Data

US 2016/0134174 A1    May 12, 2016

(30) Foreign Application Priority Data

Nov. 7, 2014  (TW) .............................. 103138797 A

(51) Int. Cl.
*H02K 9/14* (2006.01)
*H02K 9/00* (2006.01)
(Continued)

(52) U.S. Cl.
CPC .................. *H02K 9/14* (2013.01); *H02K 9/00* (2013.01); *H02K 9/02* (2013.01); *H02K 9/04* (2013.01); *H02K 9/06* (2013.01); *H02K 9/12* (2013.01)

(58) Field of Classification Search
CPC .. H02K 9/00; H02K 9/02; H02K 9/04; H02K 9/06; H02K 9/12; H02K 9/14
(Continued)

(56) References Cited

U.S. PATENT DOCUMENTS 5,693,992 A    12/1997   Kurusu et al.
6,130,491 A    10/2000   Mitamura et al.
(Continued)

FOREIGN PATENT DOCUMENTS

CN    100371607    2/2008
CN    101162858    4/2008
(Continued)

OTHER PUBLICATIONS

Zhang et al., English Machine Translation of CN 201273298.*
(Continued)

*Primary Examiner* — Bernard Rojas
*Assistant Examiner* — Rashad H Johnson
(74) *Attorney, Agent, or Firm* — WPAT, PC

(57) ABSTRACT

The present disclosure relates to a heat dispersion apparatus for motors, which comprises: a cooling fan, and a guide cover. The cooling fan has a plurality of fan blades disposed radially on a back plate, the outside portion of the fan blades axially extend beyond the periphery of the back plate, and the back plate is a cone structure. The guide cover has air inlet, a plurality of holes opened on the surface of the air inlet with slots, the slots arranged in accordance with the rotation direction of the cooling fan, and each slot set up a chamfer for leading into more air to reduce temperature. With this device, airflow supercharging and peripheral axial flow are improved, and the slot structure and the cooling fan blades can introduce a large scale of air; thereby the present invention provides a significant improvement to motors.

4 Claims, 6 Drawing Sheets

(51) Int. Cl.
- *H02K 9/04* (2006.01)
- *H02K 9/02* (2006.01)
- *H02K 9/12* (2006.01)
- *H02K 9/06* (2006.01)

(58) Field of Classification Search
USPC .................. 310/60 R, 52, 55, 62, 63, 64, 89
See application file for complete search history.

(56) References Cited

U.S. PATENT DOCUMENTS

| | | |
|---|---|---|
| 6,239,521 B1 | 5/2001 | Lee |
| 6,382,915 B1 | 5/2002 | Aschermann et al. |
| 6,997,678 B2 | 2/2006 | Sun |
| 7,134,839 B2 | 11/2006 | Horng et al. |
| 7,168,923 B2 | 1/2007 | Vasilescu et al. |
| 7,625,276 B2 | 12/2009 | Kim et al. |
| 7,977,832 B2 * | 7/2011 | Vadillo .................... H02K 9/14 310/58 |
| 8,858,198 B1 * | 10/2014 | Kopel .................... F04B 39/066 248/674 |
| 2002/0141888 A1 * | 10/2002 | Bostwick .............. F04D 17/105 417/366 |
| 2006/0008346 A1 * | 1/2006 | Ku ......................... F04D 29/329 415/143 |
| 2009/0008067 A1 * | 1/2009 | Kuan .................... F04D 29/281 165/121 |
| 2009/0136357 A1 * | 5/2009 | Vadillo ................. F04D 29/281 416/244 R |
| 2010/0059211 A1 * | 3/2010 | Li ......................... F04D 25/0613 165/121 |
| 2011/0174470 A1 * | 7/2011 | Chang ...................... F28D 7/04 165/163 |
| 2013/0064679 A1 * | 3/2013 | Tsai ......................... A01M 1/06 416/247 R |
| 2013/0234541 A1 * | 9/2013 | Oleson .................... H02K 5/12 310/54 |
| 2014/0225481 A1 * | 8/2014 | Murphy .................. H02K 9/06 310/60 R |
| 2014/0339964 A1 * | 11/2014 | Bledsoe .................. H02K 9/06 310/60 R |
| 2015/0152883 A1 * | 6/2015 | Dybenko ............ F04D 25/0613 415/220 |
| 2016/0248297 A1 * | 8/2016 | Yu ........................... H02K 9/06 |

FOREIGN PATENT DOCUMENTS

| | | |
|---|---|---|
| CN | 201273298 Y | 7/2009 |
| CN | 101715624 | 5/2010 |
| CN | 201582218 | 9/2010 |
| CN | 101975189 | 2/2011 |
| CN | 102047535 A | 5/2011 |
| CN | 102996524 | 3/2013 |
| CN | 203104212 U | 7/2013 |
| CN | 103452869 | 12/2013 |
| JP | 2007016719 | 1/2007 |
| TW | 443672 | 6/2001 |
| TW | 510528 | 11/2002 |
| TW | 200635488 | 10/2006 |
| TW | M330738 | 4/2008 |
| TW | 201228586 | 7/2012 |
| TW | I374978 | 10/2012 |
| TW | I400862 | 7/2013 |
| TW | I404496 | 8/2013 |
| TW | M460321 | 8/2013 |
| TW | I422415 | 1/2014 |
| TW | I430542 | 3/2014 |
| TW | I450512 | 8/2014 |

OTHER PUBLICATIONS

Tian et al., English Machine Translation of CN 101975189.*
Taiwan Patent Office, "Office Action," dated Oct. 21, 2015.
K Farsane, "Experimental study of the cooling of a closed type electric motor", Applied Thermal Engineering, 2000.
Hongmin Li, "Cooling of a permanent magnet electric motor with a centrifugal impeller", International Journal of Heat and Mass Transfer, 2010.
Hongmin Li, "Flow driven by a stamped metal cooling fan—Numerical model and validation", Experimental Thermal and Fluid Science, 2009.
S. Rama Krishna, "Reduction of motor fan noise using CFD and CAA simulations", Applied Acoustics, 2011.
Chih-Chung Chang, "Air cooling for a large-scale motor", Applied Thermal Engineering, 2010.
Ajay Kumar, "Magnetic field analysis of induction motor for optimal cooling duct design", Simulation Modelling Practice and Theory, 2010.
State Intellectual Property Office of the People's Republic of China , "Office Action", dated Jul. 27, 2017.

* cited by examiner

HEAT DISSIPATION APPARATUS FOR MOTORS

CROSS REFERENCE TO RELATED APPLICATION

This application also claims priority to Taiwan Patent Application No. 103138797 filed in the Taiwan Patent Office on Nov. 7, 2014, the entire content of which is incorporated herein by reference.

TECHNICAL FIELD

The present disclosure relates to a heat dissipation apparatus for motors, and more particularly, to a heat dissipation apparatus for industrial motors.

BACKGROUND

From the statistics acquired by Bureau of Energy, Ministry of Economic Affairs, R.O.C., the industrial electric consumption accounts for about 52.3% of the total electric consumption in Taiwan, which comparing to the 49.7% in Year 2009 is a significant increase. In addition, according to the research by Department of Energy in the US and EU, the electricity consumed by industrial motors accounts for about 65%~70% of all the industrial electricity consumption. Therefore, industrial energy efficiency and productivity can be greatly enhanced when there are high-efficiency motors being used commonly in all industrial systems.

Generally, the life span of a motor can be adversely affected by the increasing of the motor temperature, since high temperature can cause the material of the stator coil insulation to degrade, eventually causing stator coil burn-out or motor phase failure. Consequently, the lubrication oil in the motor's ball bearing will be thinned or even evaporated by the high temperature, which may even cause the bearing to jam.

There are already many studies for improving heat dissipation ability in motors so as to improve the motor's lifespan. One of which has a plurality of grooves to be arranged at the periphery of a blade base while the blade base is coupled to an end of a motor, where the blade base is provided for a plurality of blades to mount thereon. Thereby, when the motor is enabled to drive the plural blades to rotate, the heat produced by the operating motor can be dissipated from the plural grooves formed on the blade base.

Please refer to FIG. 1, which is a conventional heat dissipation apparatus with heat dissipating fan and guide cover. In FIG. 1, there are a plurality of blades 51 being disposed on a back plate of a heat dissipating fan 5 while allowing the plural blades 51 to protrude out of the periphery of the back plate 50, and a chamber to be formed between the plural blades 51 and the center protrusion of the back plate 50. Moreover, the guide cover 6 is formed with a plurality of criss-crossing slots 61. However, despite the improvement in air flow and the reduction in motor temperature that are provided in all the aforesaid prior arts, there is still a need of an improved heat dissipation apparatus with a cooling fan.

SUMMARY

The present disclosure provides a heat dissipation apparatus for motors, and more particularly, a heat dissipation apparatus for industrial motors, which is characterized in that: the cooling fan used in the heat dissipation apparatus adopts an axial structure with centrifugal blade arrangement for radial flow acceleration and axial flow guidance. In addition, the cooling fan is designed to operate cooperatively with a guide cover, whereas the guide cover is formed with a plurality of slots, and the center area of the plural slots are radially disposed into a vortex-like arrangement while the periphery area of the plural slots are concentric arcs with guiding angles for air flow guidance.

The heat dissipation apparatus is adapted for a motor and is comprised of: a cooling fan and a guide cover. The cooling fan has a back plate and a plurality of blades, whereas the plural blades are concentrically and radially arranged on a surface of the back plate; and the guide cover is formed with an air inlet and a plurality of slots formed on a surface thereof where the air inlet is disposed.

In an embodiment, each of the plural blades is formed with an extension, which is a portion of the blade that is disposed extending out of the back plate, and is formed curving toward an axial flow direction.

In an embodiment, the plural blades with their extensions are alternately arranged, while the back plate is substantially an oblique cone structure.

In an embodiment, the plural slots are arranged in accordance with the direction of rotation of the cooling fan and also in correspondence to the arrangement of the plural blades, while each of the plural slots is formed with a guide angle for reducing air resistance, and a portion of the plural slots that are disposed at a center area are radially disposed into a vortex-like arrangement while the other portion of the plural slots that are disposed at a periphery area are arcs that are concentrically arranged into an axial flow arrangement in a manner that the outer the so-constructure concentric zone the arcs are longer.

Thereby, the heat dissipation apparatus for motors of the present disclosure can introduce a large scale of air to a motor, and thus a significant improvement of air intake is introduced to the motor for enabling great heat dissipation efficiency.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
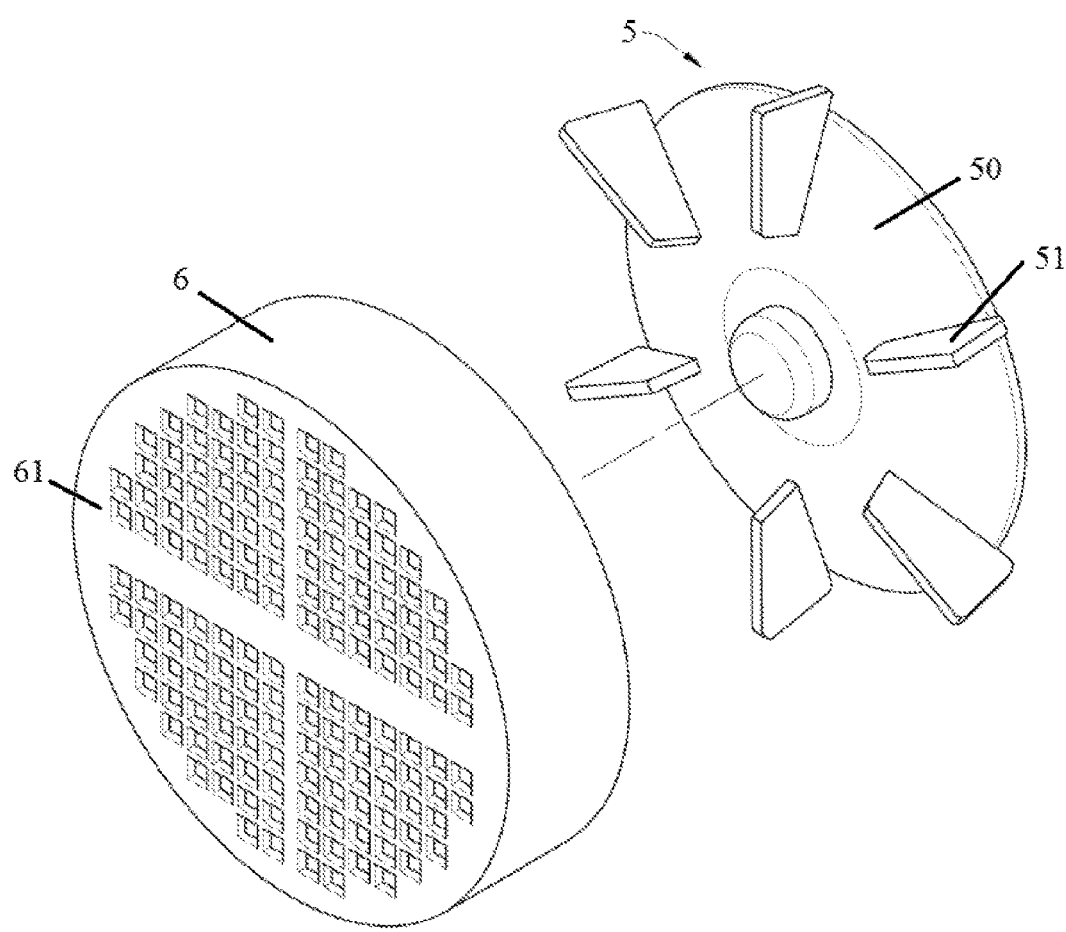
FIG. 1 is a schematic diagram showing a conventional heat dissipation apparatus with heat dissipating fan and guide cover.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
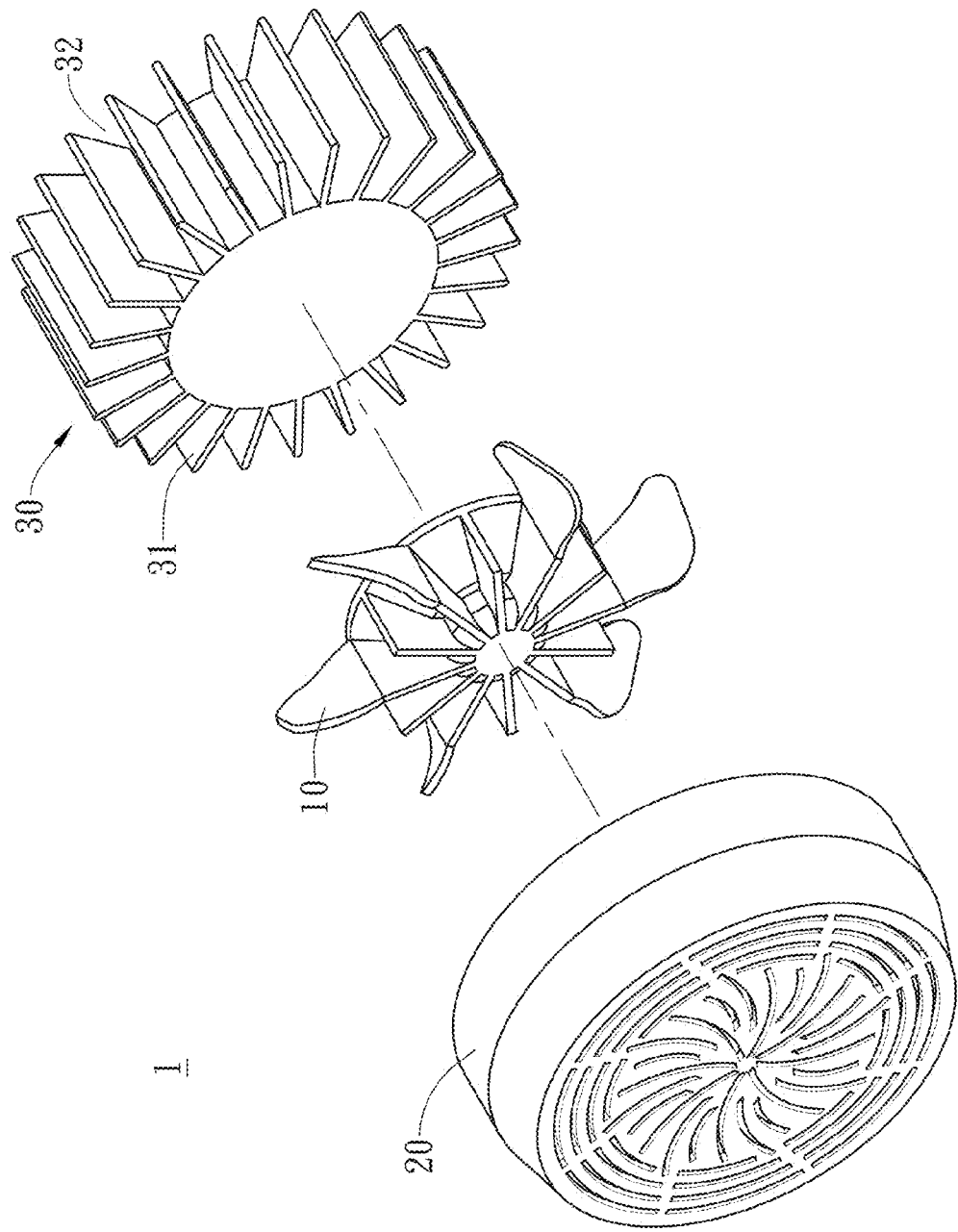
FIG. 2 is a schematic diagram showing a heat dissipation apparatus for motors according to an embodiment of the present disclosure.
Figure 3:
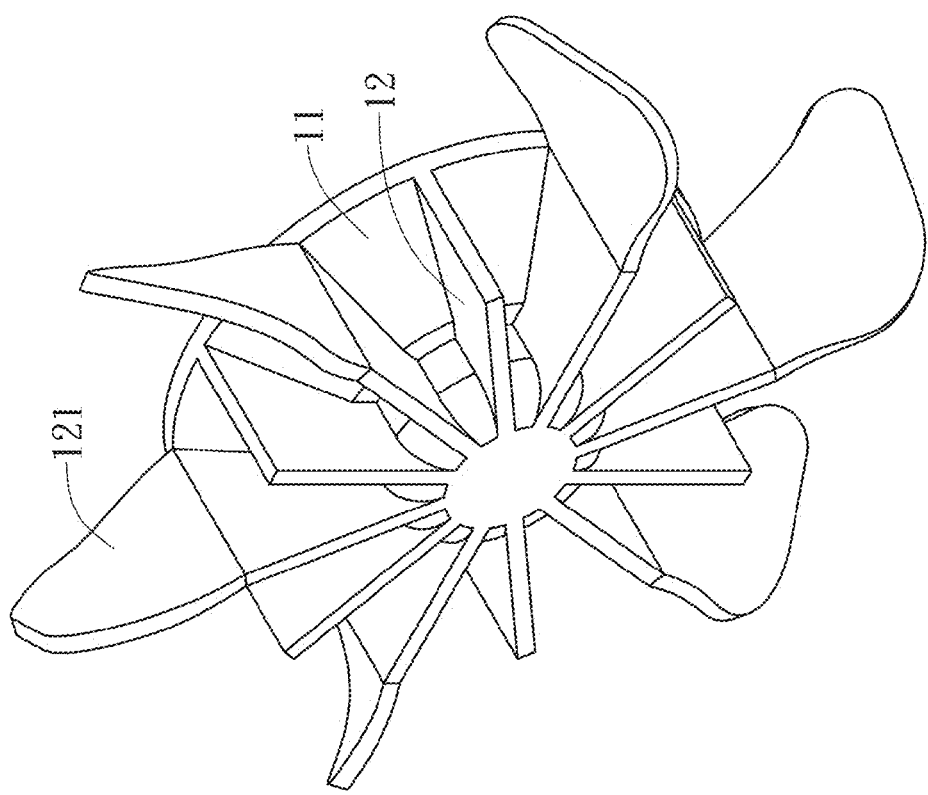
FIG. 3 is a schematic diagram showing a cooling fan of the present disclosure.

Please refer to FIG. 2, which is a schematic diagram showing a heat dissipation apparatus for motors according to an embodiment of the present disclosure. In this embodiment, a heat dissipation apparatus 1 is disposed in a motor 30, and is composed of: a cooling fan 10 and a guide cover 20. As shown in FIG. 3, the cooling fan 10 has a back plate 11, and a plurality of blades 12 with extensions 121, whereas the plural blades 12 are concentrically and radially arranged on a surface of the back plate 11, i.e. the blades are arranged extending from the center of the cooling fan 10 in a radially distributed manner at a surface of the back plate. It is noted that the back plate 11 can be an oblique cone structure.

Moreover, each of the extensions 121 extension is substantially a portion of the blade 12 that is disposed extending beyond the back plate 11, and is formed curving toward an axial flow direction.

In addition, the plural blades 12 with their extensions 121 are alternatively arranged.

Figure 4:
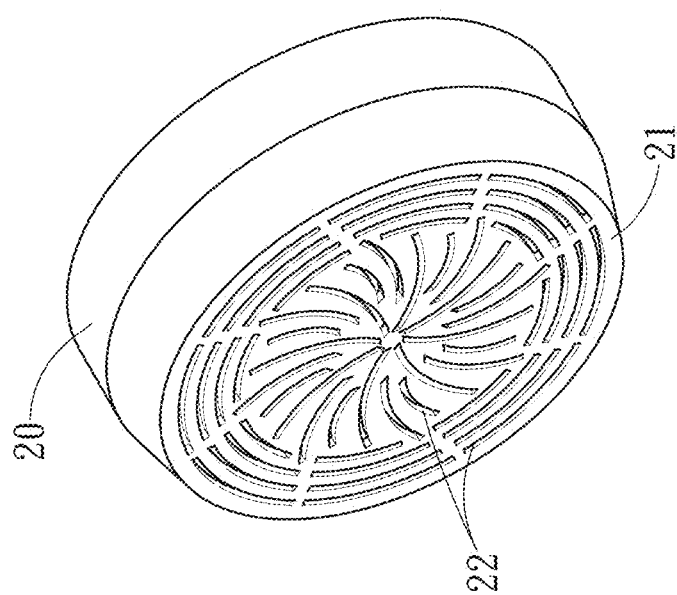
FIG. 4 is a schematic diagram showing a guide cover of the present disclosure.

Please refer to FIG. 4, which is a schematic diagram showing a guide cover of the present disclosure. In FIG. 4, the guide cover 20 is formed with an air inlet 21 and a plurality of slots 22 formed on a surface thereof where the air inlet 21 is disposed. Moreover, the plural slots 22 are arranged in accordance with the direction of rotation of the cooling fan 10 and also in correspondence to the arrangement of the plural blades 12, while enabling a portion of the plural slots that are disposed at a center area to be radially disposed into a vortex-like arrangement and enabling the other portion of the plural slots that are arcs disposed at a periphery portion to be concentrically arranged. It is noted that the plural slots that are disposed at the periphery area are arranged into an axial flow arrangement in a manner that the outer arcs are longer. In addition, each of the slots 22 is formed with a guide angle on its surface for reducing air resistance.

In the present disclosure, the provided heat dissipation apparatus 1 for motors, characterized in that: the cooling fan 10 is designed to operate cooperatively with the guide cover 20, by that airflow supercharging and peripheral axial flow improvement can be achieved effectively; and the guide cover 20 is formed with a plurality of slots 22 that are designed in correspondence to the arrangement of the plural blades 12, by that massive air flow can be introduced to flow into the channel formed between the plural heat dissipating fins 31 of the motor 30 for dissipating heat, and thus the air flow as well as the heat dissipating efficiency are improved.

Figure 5:
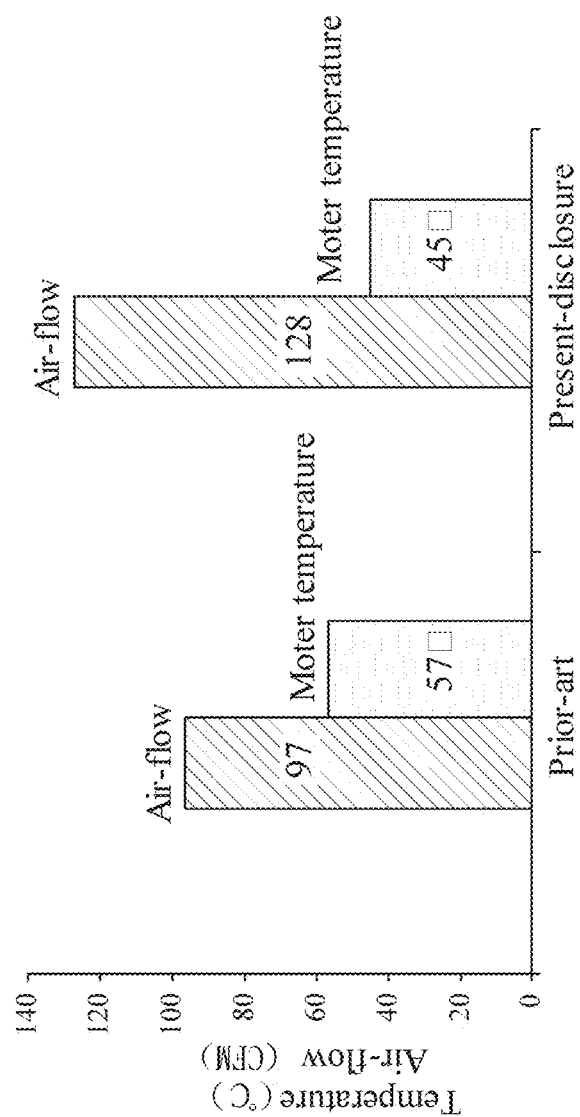
FIG. 5 is chart comparing the performance of a prior-art device with a heat dissipation apparatus of the present disclosure.

In an experiment conducted using the heat dissipation apparatus of the present disclosure, the obtained data is analyzed to be used in a comparison for statistically proving that the heat dissipation apparatus of the present disclosure, comparing with those prior-art heat dissipation devices, can be more effective in heat dissipation. The aforesaid experiment is conducted under the following conditions:

turbulence model: k-ε model
boundary condition: air inlet/outlet boundary
fan speed: 3600 rpm
rotation mode: MRF
grid number: 2750000
convergence condition: $10^{-6}$ By the application of ANASYS-Fluent simulation, a performance comparison can be obtained, as disclosed in FIG. 5 which is chart comparing the performance of a prior-art device with a heat dissipation apparatus of the present disclosure. As shown in FIG. 5, the air flow of the present disclosure is clearly larger, so that the temperature of the corresponding motor is lower.

Figure 6:
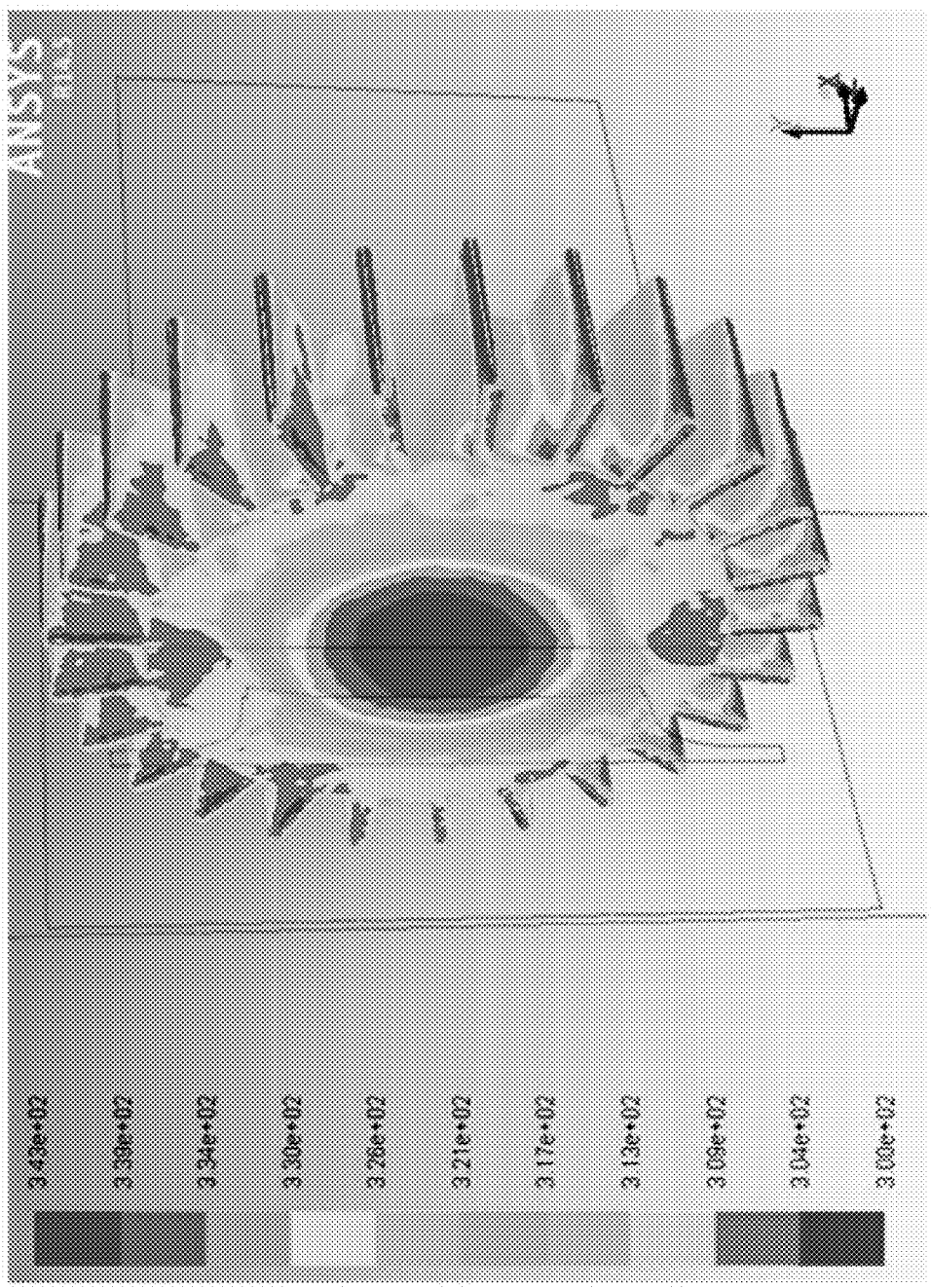
FIG. 6 is a diagram showing the temperature distribution comparison between of a prior device and a heat dissipation apparatus of the present disclosure.

Please refer to FIG. 6, which is a diagram showing the temperature distribution comparison between of a prior device and a heat dissipation apparatus of the present disclosure. As shown in FIG. 6, it is clear that the temperature distribution achieved by the heat dissipation apparatus of the present disclosure is better, as the temperature of the motor is decreased effectively.

From the above comparison, it is clear that the heat dissipation apparatus of the present disclosure is not only designed with the improved cooling fan and guide cover, but also is more effective in that:

(1) the cooling fan used in the heat dissipation apparatus adopts an axial structure with centrifugal blade arrangement for radial flow acceleration and axial flow guidance; and (2) by enabling a portion of the plural slots of the guide cover that are disposed at a center area to be radially disposed into a vortex-like arrangement and enabling the other portion of plural slots that are arcs disposed at a periphery area to be concentrically arranged, the flow guidance effect can be enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A heat dissipation apparatus, being adapted for a motor, comprising:
   a cooling fan, comprising:
      a circular back plate; and
      at least one first blade, each of the at least one first blades comprising:
         a flat portion, flat along a radial direction of said circular back plate and extending from said circular back plate in an axial flow direction; and
         a curved portion, extending from said flat portion in said radial direction beyond said circular back plate, and formed curving toward said axial flow direction; and
      at least one second blade, flat along said radial direction, extending in said axial flow direction, and having a radial end co-terminal with a radial edge of said circular back plate;
      wherein the first blades and the second blades are alternately arranged; and a guide cover, comprising:
- a radially-aligned air slot, wherein said radially-aligned air slot is slanted in said axial flow direction and curved in said radial direction in accordance with a rotation direction of the cooling fan in a vortex-like arrangement; and
- a concentrically-aligned air slot disposed peripheral to said radially-aligned air slot on the guide cover, wherein said concentrically-aligned air slot is aligned with the radial periphery of said guide cover, wherein each of the radially-aligned air slot and the concentrically-aligned air slot is formed with a guide angle for reducing air resistance.

2. The heat dissipation apparatus of claim 1, wherein said curved portion is curved to move air in said axial flow direction upon rotation of said cooling fan.

3. The heat dissipation apparatus of claim 2, wherein the circular back plate is substantially a cone structure.

4. The heat dissipation apparatus of claim 1, wherein the circular back plate is substantially a cone structure.

* * * * *